United States Patent [19]

Roger

[11] Patent Number: 4,989,365

[45] Date of Patent: Feb. 5, 1991

[54] MACHINES FOR TRAINING PLANTS

[75] Inventor: Pellenc Roger, Pertuis, France

[73] Assignee: Etablissements Pellenc Et Motte s.a., Pertuis, France

[21] Appl. No.: 283,354

[22] Filed: Dec. 12, 1988

[51] Int. Cl.[5] .......................................... A01G 17/08
[52] U.S. Cl. .......................................... 47/1.01; 47/1.7
[58] Field of Search ................................. 47/1.01, 1.7

[56] References Cited

U.S. PATENT DOCUMENTS 3,526,055  9/1970  Cortopasse ......................... 47/1.01

FOREIGN PATENT DOCUMENTS 2426612 11/1975 Fed. Rep. of Germany ....... 47/1.01
206938  11/1967 U.S.S.R. ............................... 47/1.01
674726   7/1979 U.S.S.R. ............................... 47/1.01
674727   7/1979 U.S.S.R. ............................... 47/1.01

Primary Examiner—Henry E. Raduazo
Attorney, Agent, or Firm—Kinney & Lange

[57] ABSTRACT

A machine for training plants to be supported between two lifting wires positioned one to each side of a row of such plants. The machine includes a head comprising first and second lifting means for raising from ground level the aforesaid lifting wires and plant vegetation to be supported therebetween, first and second guide means positioned behind the lifting means in the intended direction of travel of the machine for guiding and drawing together the raised lifting wires, and connection means positioned behind the guiding means in the intended direction of travel of the machine for interconnecting the raised lifting wires. The arrangement is such that, in operation of the machine, the said first lifting means and said first guide means are positioned on one side of said row of plants and said second lifting means and said second guide means are positioned on the other side of said row of plants.

20 Claims, 17 Drawing Sheets

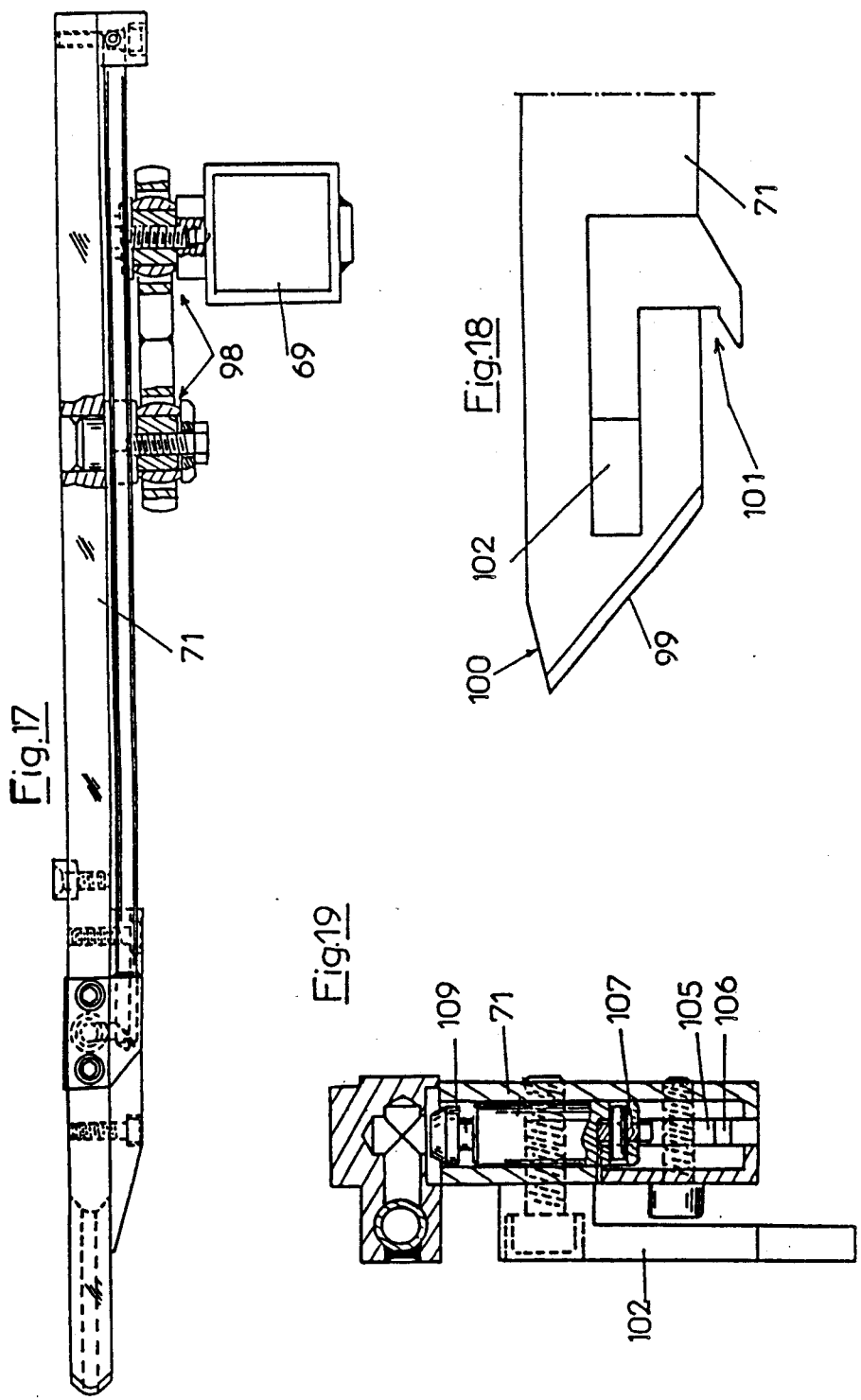

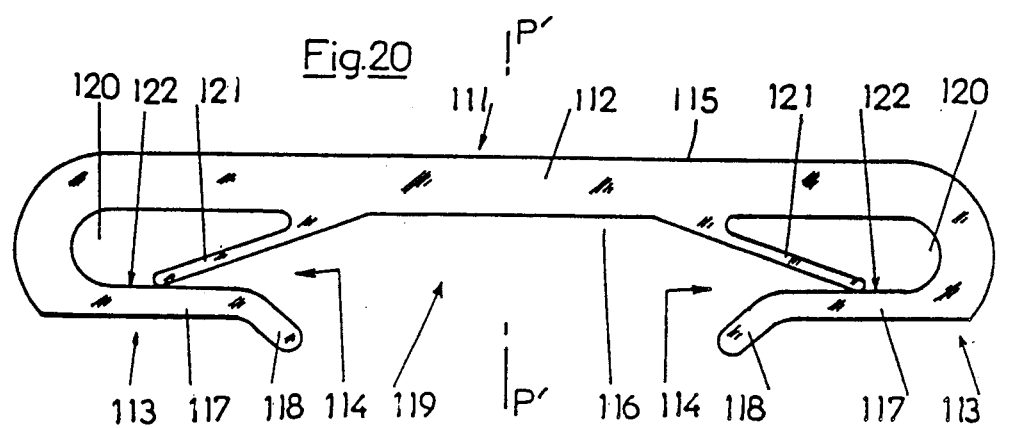
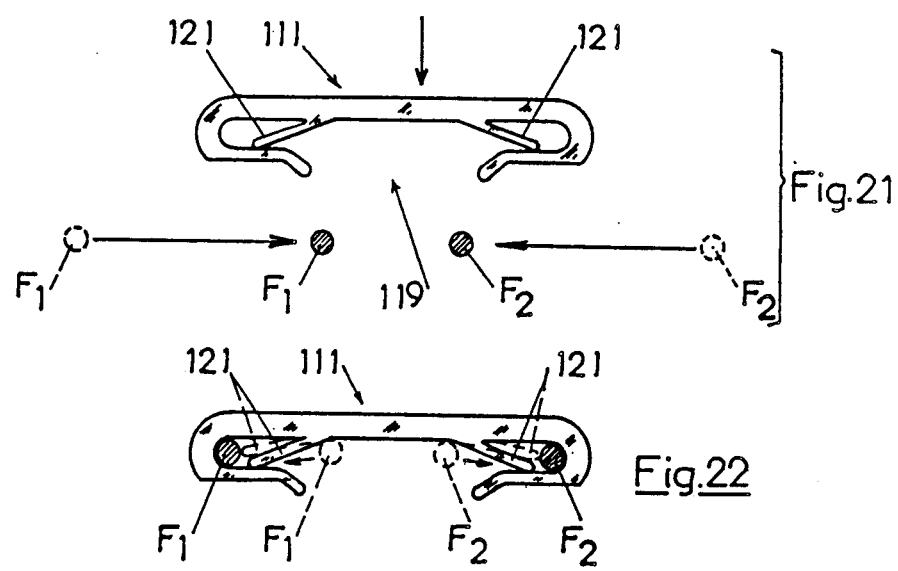

MACHINES FOR TRAINING PLANTS

BACKGROUND OF THE INVENTION

The present invention relates to a machine for training vines or other plants or shrubs such as currant bushes, raspberry bushes, etc., planted in parallel rows, using lifting wires and clips. The invention also relates to a clip fastener specially designed for use with the machine.

In viniculture, it is usual to raise the vine shoots or drooping shoots and to hold them in an upright position by means of two plant training wires positioned one on each side of each row of vines, the wires being linked together at spaced locations by means of clips. In this way the grapes of the vines have increased exposure to the sun, thereby encouraging them to ripen while at the same time providing assistance against the development of plant diseases, in particular those affecting cryptogamic plants. Moreover, training of the plants in this way makes the vines more accessible for cultivating, harvesting and processing machinery, allowing these to be operated more efficiently.

DESCRIPTION OF THE PRIOR ART

Hitherto, one method of training plants employed in some vineyards has been to position two metal wires known as "lifting wires" on either side of each row of vine stocks, these wires being fixed by their ends to stakes placed at the row ends. In winter, these lifting wires become slack and either rest on the ground or hang close to the ground. Towards the end of spring or the beginning of summer when new plant growth is sufficiently advanced, the lifting wires are raised and tightened, so that boughs and bent branches face the sun. The lifting wires are then joined by positioning a link (e.g. a twine or clip fastener), on either side of each plant, thereby enclosing the raised plant vegetation.

This previous method of training offers the advantage of greater efficiency compared to other training methods. However, the operations of raising, fastening or connecting, and tensioning the lifted wires are at present performed by hand and involve lengthy and laborious procedures requiring a significant number of workers.

SUMMARY OF THE INVENTION

It is an object of this invention to overcome the disadvantages identified above.

In accordance with the invention there is provided a machine for training plants to be supported between two lifting wires positioned one to each side of a row of such plants, the machine including a plant training head comprising first and second lifting means for raising from ground level the aforesaid lifting wires and plant vegetation to be supported therebetween, first and second guide means positioned behind the lifting means in the intended direction of travel of the machine for guiding and drawing together the raised lifting wires, and connection means positioned behind the guiding means in the intended direction of travel of the machine for interconnecting the raised lifting wires, the arrangement being such that, in operation of the machine, the said first lifting means and said first guide means are positioned on one side of said row of plants and said second lifting means and said second guide means are positioned on the other side of said row of plants.

This machine allows the operation of raising and interconnecting the lifting wires, to be performed entirely by mechanical means and with only one operator. Raising and connecting the lifting wires can, therefore, be done rapidly, without excessive fatigue, and in a far more economic fashion.

In accordance with the invention, there is further provided a clip fastener operable to interconnect two side-by-side wires, said clip being made from an elastically deformable material and comprising a rectilinear body having plane side faces and generally parallel external and internal faces, the ends of the clip body being bent back to define two opposed hooks whose openings face one another, each hook having a limb spaced from the clip body and extending generally parallel thereto in the direction of the median plane of the clip, the hooks being symmetrical and generally identically configured, and elastically deformable means positioned at the entrance to the space defined by the internal boundary of each hook.

BRIEF DESCRIPTION OF THE DRAWINGS

The invention will now be described by way of example only with reference to the accompanying diagrammatic drawings, wherein:

FIG. 17 is a plan view showing a movable clip attachment jib of the illustrated machine;

FIG. 18 is a detail and front view of the front end of the jib illustrated in FIG. 17;

FIG. 19 is a transverse sectional view of the jib illustrated in FIGS. 17 and 18 and a clip fastener placing device;

FIG. 20 is a front view of a clip in accordance with the invention;

FIGS. 21 and 22 are front views illustrating the manner in which the clip illustrated in FIG. 20 is placed on two lifting wires to produce a link therebetween;

DETAILS AND DESCRIPTION OF THE PREFERRED EMBODIMENTS

Figure 1:
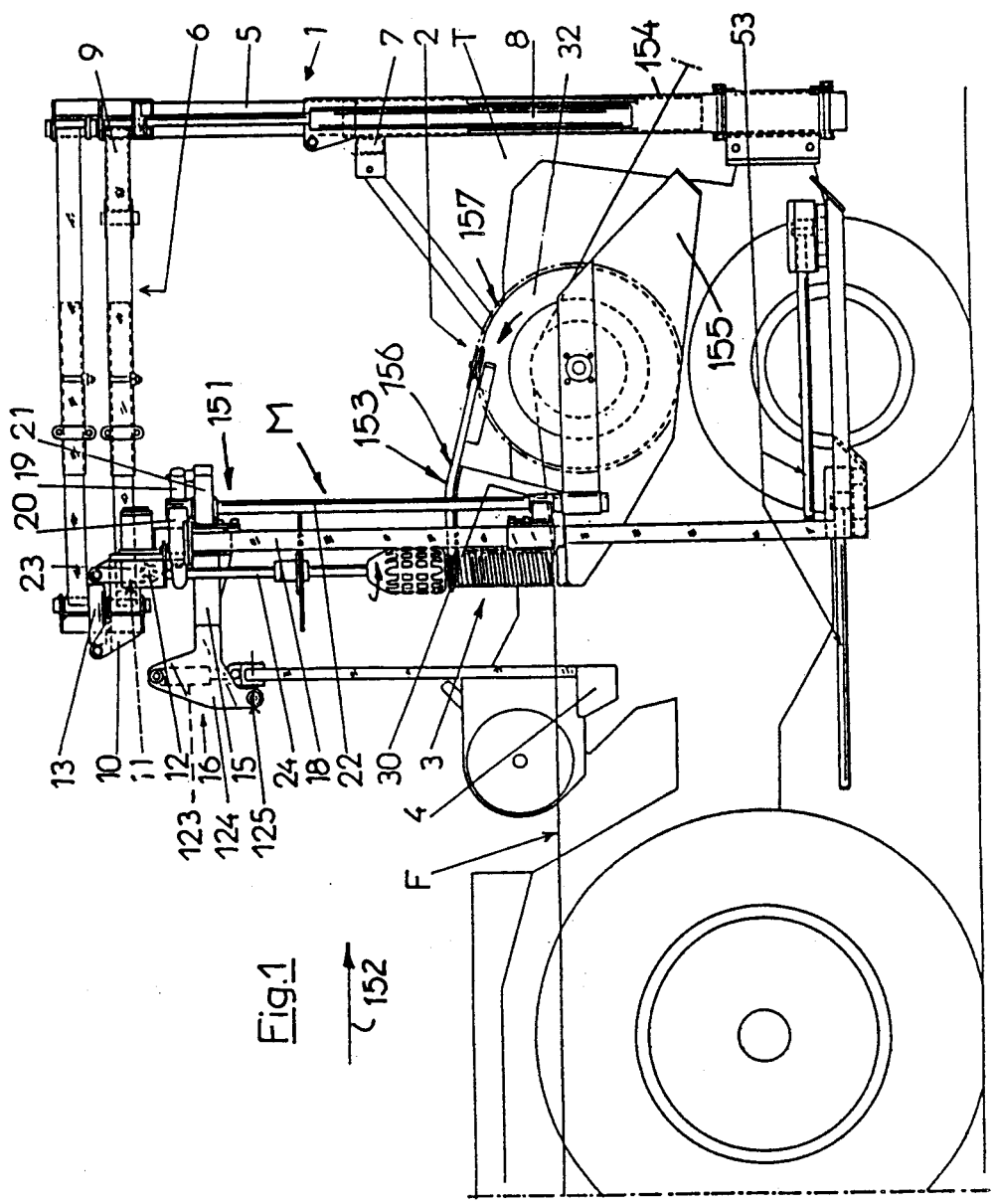
FIG. 1 is a schematic side view of a plant training machine in accordance with the invention mounted on a conventional agricultural tractor.

A plant training machine M illustrated in the drawings takes the form of a mounted machine which is capable of being installed on a conventional agricultural tractor T. It is to be understood, however, that the illustrated machine is merely exemplary of plant training machines in accordance with the invention.

Figure 2:
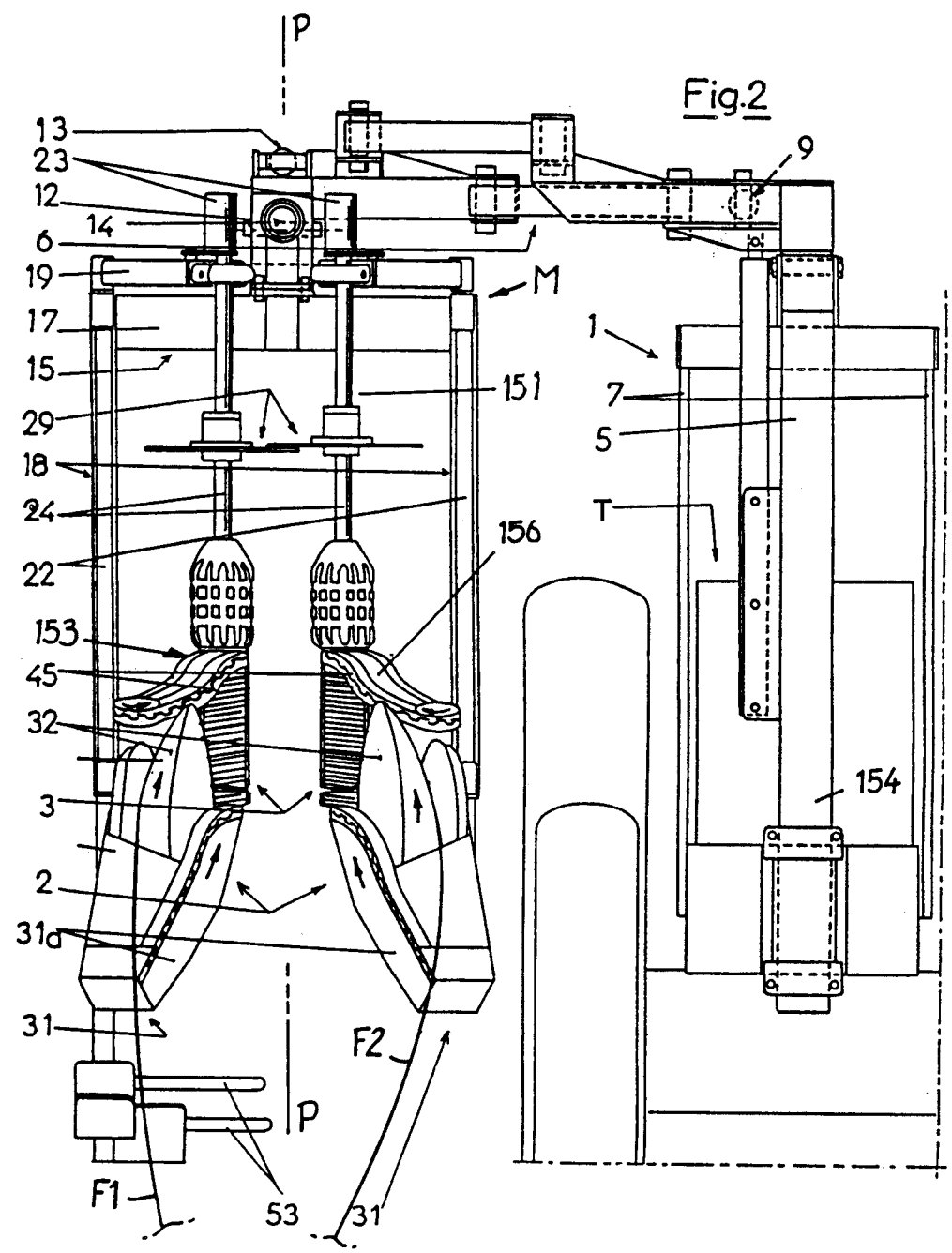
FIG. 2 is a front view of the plant training machine illustrated in FIG. 1.

As will be seen from FIGS. 1 and 2, the illustrated plant training machine M includes a sturdy tractor-mounted chassis 1 by which the machine can readily be installed on the front or back of the tractor T or other appropriate prime mover. The chassis 1 carries a plant training head 151 which is laterally positioned with respect to the direction of travel of the tractor. That direction is indicated by the arrow 152. The plant training head 151 includes the following integers: two substantially identical lifting and guiding assemblies 153 which are disposed one on either side of a plane of symmetry P—P of the plant training head 151. These assemblies 153 include a lifting means 157 for raising and guiding lifting wires F and for raising and channeling the growing vegetation of the plants which are being trained and which are supported by these wires; and a wire guide means 3 positioned one to the rear of each lifting means 157 for drawing together and guiding the lifting wires F (only one of which is shown). The head 151 also includes a clip attachment assembly 4 positioned to follow the guide means 3 in the direction of travel of the machine for fastening together or connecting the neighbouring lifting wires F.

The tractor-mounted chassis 1 includes a load-bearing support 154 comprising upright and cross-piece members 5, 6, respectively. The upright 5 is rigidly joined to a strengthening and mounting frame 7, both of which are supported on the tractor T. The upright 5 is advantageously constructed in two telescopically assembled parts which can be moved one relative to the other by a hydraulic jack 8. The jack 8 is positioned to one side and lies generally parallel to the telescopic parts and is operable to adjust the length of the upright 5 and, consequently the height of the plant training head 151 above ground level to take account of the characteristics and height of the vegetation of the plants to be trained.

Figure 3:
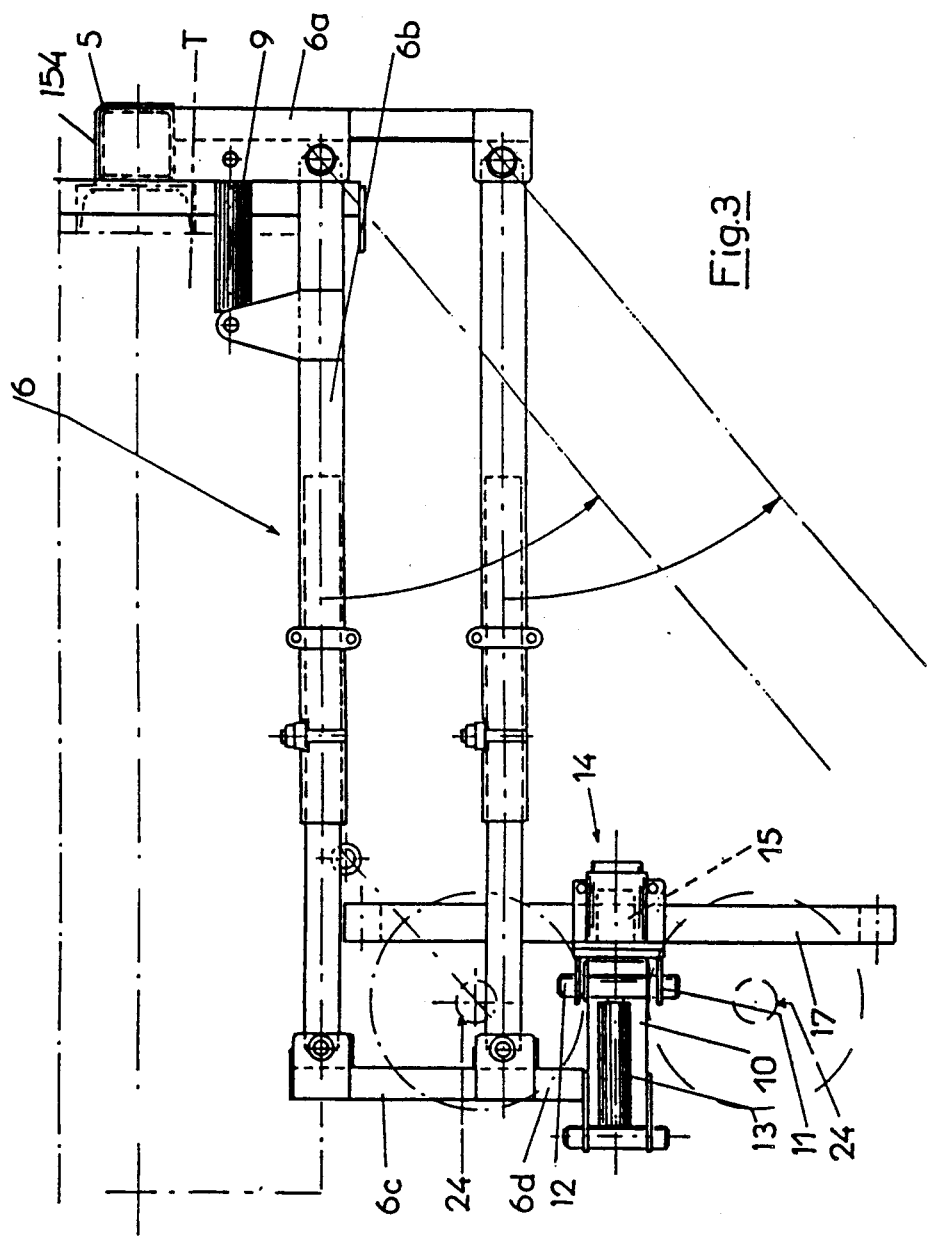
FIG. 3 is a plan view from above of a tractor mounted chassis from which a plant training head of the plant training machine illustrated in FIGS. 1 and 2 is supported.

As will be seen from FIG. 3 of the drawings, the cross-piece 6 of the load-bearing support 154 is laterally offset with respect to the upright 5 and comprises a conventional articulated parallelogram system in which the longer sides of the parallelogram constitute the crosspiece proper.

As will be described in more detail below, the plant training head 151 is suspended from one shorter movable arm 6c of the articulated parallelogram system, such that, when in use, it is at all times positioned laterally with respect to the tractor T on which the machine is mounted. This enables the distance between the tractor and the plant training head 151 to be adjusted while maintaining the plant training head in its desired position with respect to the rows of bushes to be trained. Swivelling of this cross-piece 6 through adjustment of the relative positions of the sides of the articulated parallelogram, is achieved by means of a hydraulic jack 9 which is hingedly connected at its one end to an arm 6a comprising a fixed arm of the parallelogram system and at its other end to one movable arm 6b of the parallelogram system.

Figure 4:
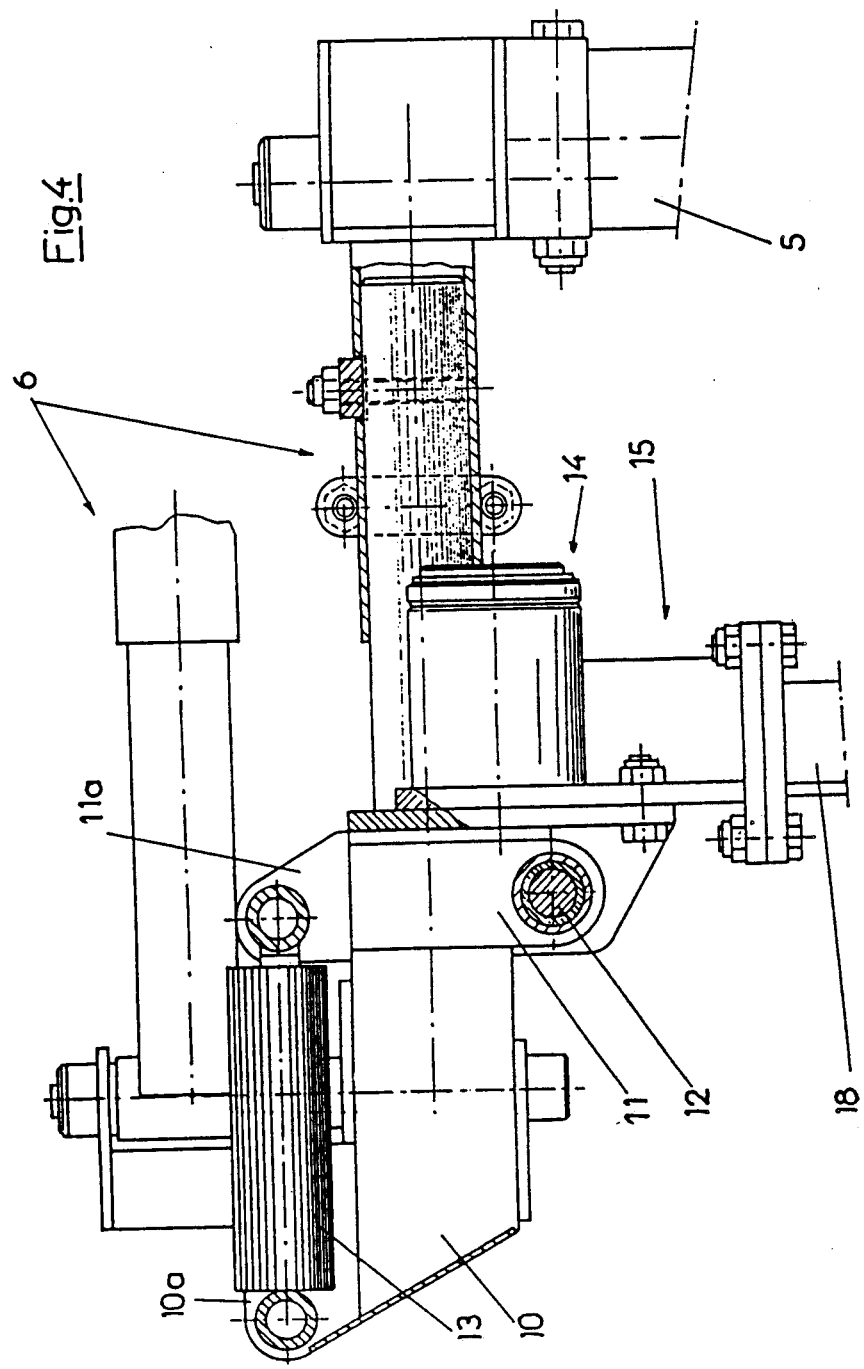
FIG. 4 is a side view to an enlarged scale of a detail of the machine illustrated in FIGS. 1 and 2 showing, in partial cross-section, a suspension frame for the plant training head of the machine.

The movable arm 6c of the articulated parallelogram system has a lateral extension 6d which is rigidly connected to a load-bearing frame 10. The plant training head 151, or plant training machine M proper, is suspended from the frame 10 through a suspension frame 11 (see also FIG. 1). The suspension frame 11 is supported from the load-bearing frame 10 by a hinge comprising a transverse hinge pin 12. By this means, the suspension frame 11, and consequently the plant training head 151 supported therefrom, can be moved in a rocking motion to and fro in directions generally parallel to the direction of travel of the tractor. As will be seen from FIG. 4, rocking movements of the plant training machine M and head 151 are damped by a standby cylinder or shock absorber 13 (or by a suitable spring) fixed between attachment yokes 10a, 11a, rigidly joined respectively to the load-bearing frame 10 and the suspension frame 11.

Supported from the suspension frame 11 by means of a hinge comprising an axle 14 is a main chassis 15 which carries lifting means 157 and guide means 3 of the plant training head 151 and from the rear portion of which is suspended an auxiliary chassis 16 which supports the clip attachment assembly 4. In this manner each chassis 15 and 16, and consequently the assembly of the plant training head proper, is mounted for sideways rocking movement in a plane perpendicular to the direction of travel of the machine.

Figure 5:
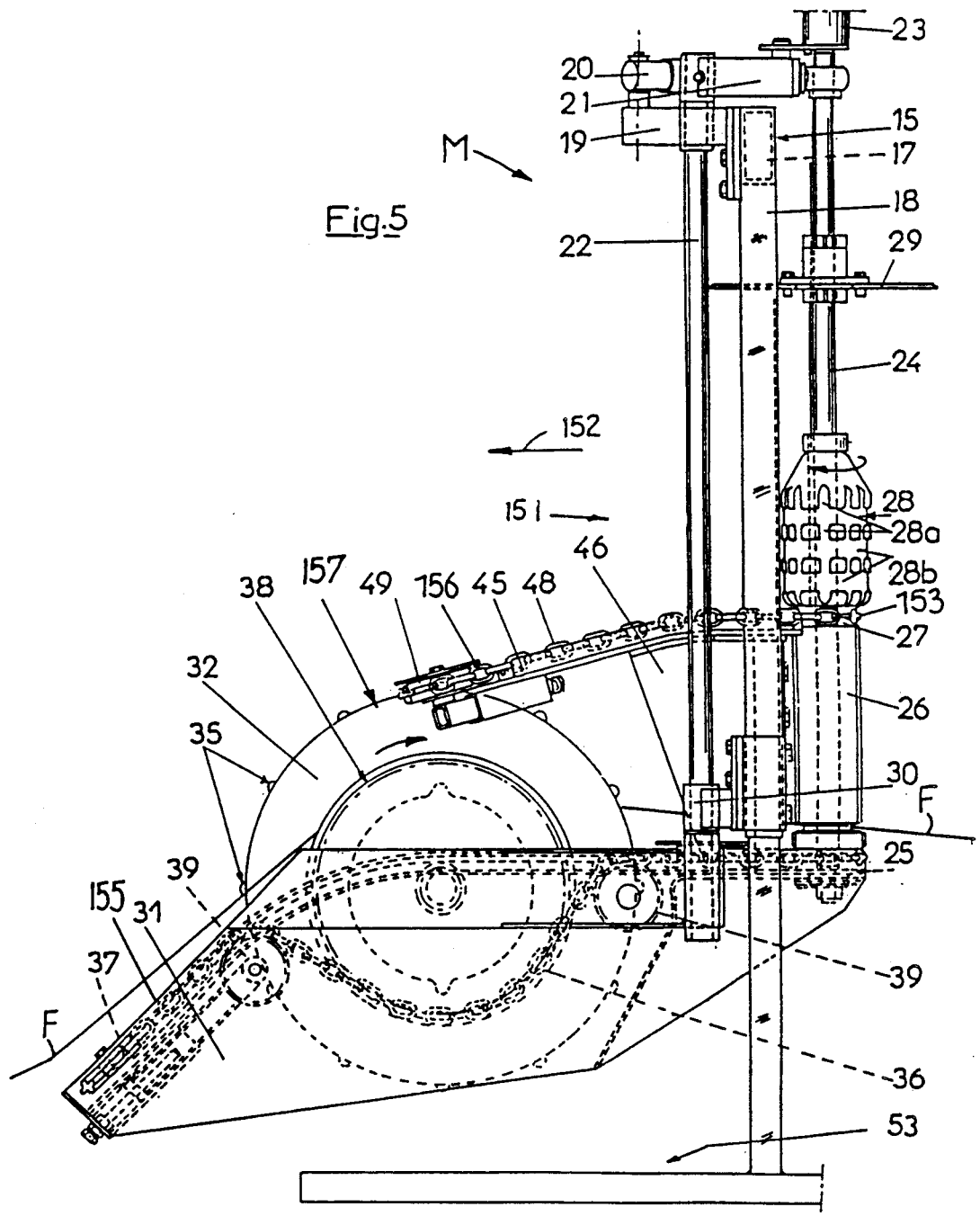
FIG. 5 is a side view of a part of the illustrated machine, more particularly illustrating lifting means for raising and guiding lifting wire and for raising and channeling vegetation, these means forming part of a lifting and guiding assembly of the plant training head illustrated in FIG. 3.

As will be seen from FIG. 5, the main chassis 15 specifically comprises a sturdy upper horizontal cross-piece 17, and two downwardly extending generally vertical uprights 18 rigidly joined to the opposite ends of the cross-piece 17.

On its upper end, each upright 18 is rigidly connected to one end of a forwardly extending generally horizontal arm 19. A single-acting hydraulic cylinder 20 is connected at one end to the arm 19 by means of a hinge. The other end of the cylinder 20 is connected, likewise by means of a hinge, to a second horizontal arm 21, which is in turn, supported on the upper end of a swivelling vertical shaft 22 carried and guided by the fixed arm 19; the arm 21 is thus able to swivel in concert with the shaft 22. In the vicinity of its lower end, the shaft 22 is held and guided in a sleeve 30 rigidly connected to the respective upright 18 of the main chassis 15.

Each arm 21 carries a hydraulic motor 23, each motor 23 being positioned above its respective arm 21 and coupled to a vertical transmission shaft 24.

The following members are successively mounted on each of the two transmission shafts 24 when viewed from bottom of each shaft to top thereof: (1) a first transmission gear 25 which comprises a recessed sprocket and is operable to transmit drive to a lower wire raising and vegetation channeling device 155 forming part of the lifting means 157 for raising the wires F and raising and channeling the lower vegetation of plants to be trained; (2) a guide means 3 in the form of a guide; (3) a second transmission gear 27 which comprises a recessed sprocket and is operable to transmit drive to an upper vegetation channeling device 156 for channeling the upper vegetation of plants to be trained; (4) a protecting and conveying sleeve 28; and (5) a vegetation cutting and conveying assembly 29.

Each lower wire raising and vegetation channeling device or main lifter 155 includes a deflector-type casing 31. As will be seen from FIG. 2, the inside walls 31a of the casings 31 converge from front to back in the direction of the plane of symmetry P—P of the plant training head 151. The deflector type casings 31 are rigidly mounted on the lower ends of the shafts 22.

Each deflector-type casing 31 includes a lifting means 157 in the form of a rotary member 32 constituted by a disk of generally truncated shape whose peripheral edge of greatest diameter is directed towards the plane of symmetry of the plant training head 151. As will be seen from FIGS. 6 and 7, at its periphery each truncated disk 32 is provided with an annular groove 33 in which are disposed spaced transverse bars 34; the bars may, for example, be spaced at 60 degree intervals.

Each member 32 carries, on said peripheral edge of greatest diameter, a plurality of spaced radial lifting lugs 35. These lugs 35 may, for example, be spaced at 30 degree intervals. The lugs 35 present a heel 35a which is directed towards the axis of the respective member 32 and forms a radial projection on the convex external face of the rotary member.

The principal functions of the rotary members 32 are to contact the lifting wires F on the ground or close to the ground, to raise them up and to insert them into the grooves 33.

The bars 34 and the heels 35a enable the lifting wires F to be set into vibration, as the work proceeds, so that the wires F slide more easily over the foliage of the plants, bushes or shrubs to be trained.

Figure 6:
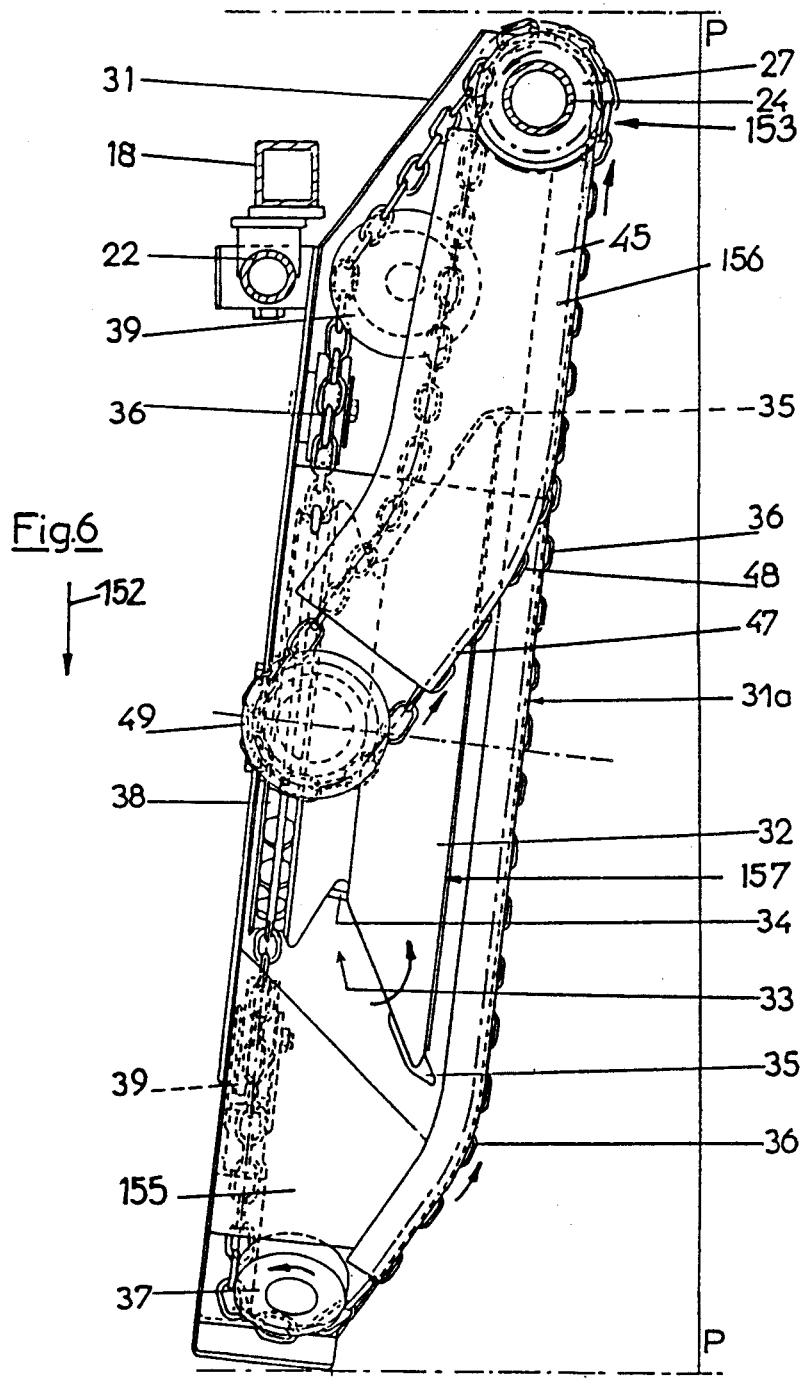
FIG. 6 is a plan view from above of the lifting and guiding assembly illustrated in FIG. 5.
Figure 7:
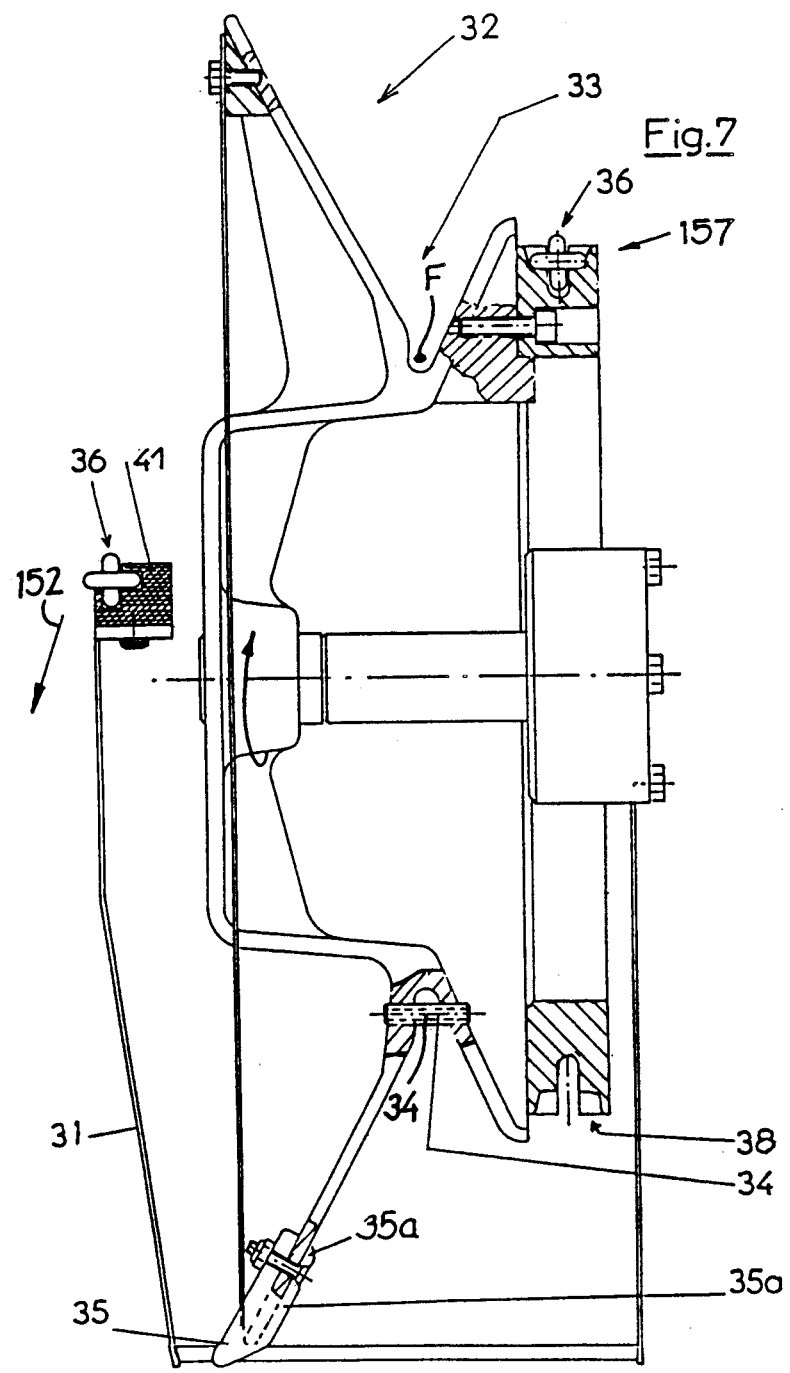
FIG. 7 is a diametric sectional view of a rotary member with which each lifting means of the illustrated machine is equipped and a deflector-type casing for the rotary member.

As will be seen from FIGS. 5 to 7, each rotary member 32 is driven by the first transmission gear 25 through a calibrated chain 36 which runs between the gear 25 and a driven gear 37 positioned at the front end of the respective casing 31. Each chain 36 also passes through a recessed groove 38 set in the lesser periphery of the rotary member 32, and around a number of intermediate gears 39.

Figures 8, 9:
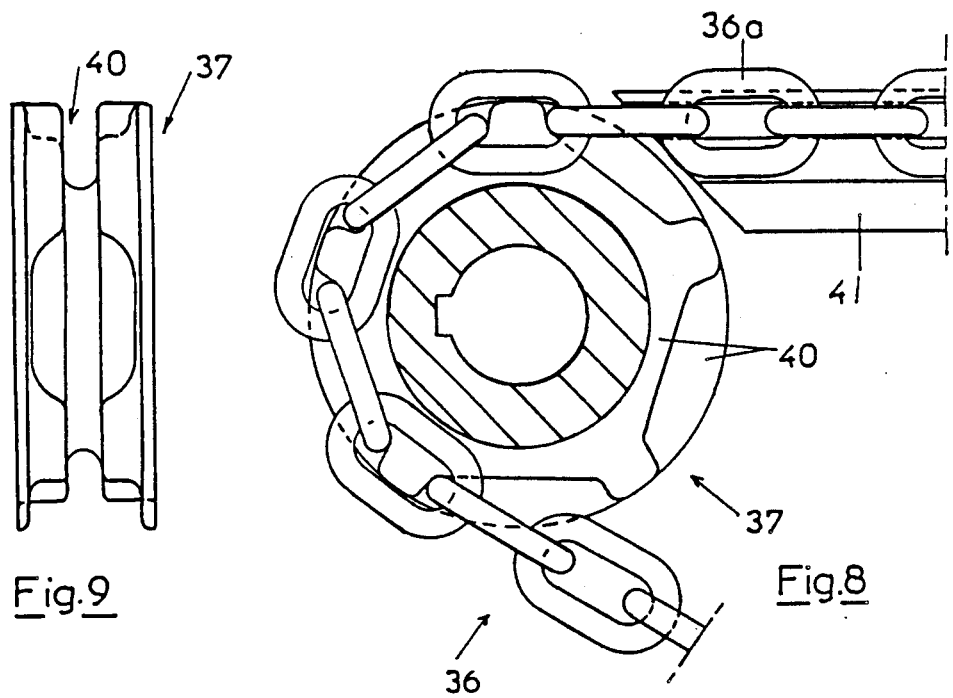
FIG. 8 illustrates, in partial cross-section, a chain and drive sprocket therefor provided on lower and upper lifting means of the machine.
FIG. 9 a side view of the drive sprocket illustrated in FIG. 8.

As will be seen more clearly from FIGS. 8 and 9 of the drawings, each calibrated chain 36 comprises a plurality of perpendicular round links 36a, of a type commonly used in handling operations. Moreover, the various gears over which the chains run comprise recessed sprockets having grooves 40 which conform to the configuration of the chain.

Likewise, the recessed groove 38 of each rotary member 32 is adapted to conform to the configuration of the chain.

Figure 10:
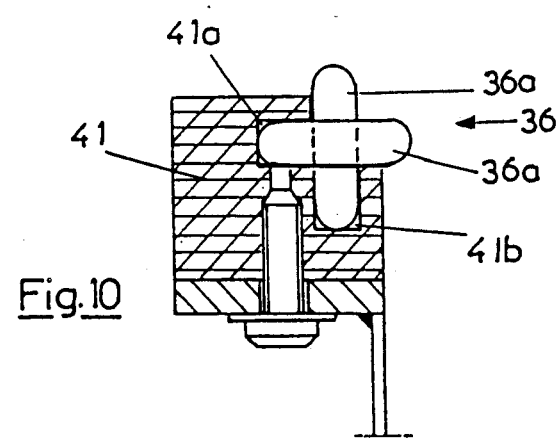
FIG. 10 is a transverse sectional view of a guide track of the chain illustrated in FIG. 8.

As will be seen from FIGS. 7 and 10 the inside top edge of each deflector-type casing 31 is formed with a guide track 41 comprising a plastics profiled member having two grooves 41a, 41b set at right angles to one another into the inside top corner of the profiled member. The chain links 36a pass along the horizontal groove 41a of the guide track 41 and protrude laterally beyond the inside face of the guide track.

Figure 11:
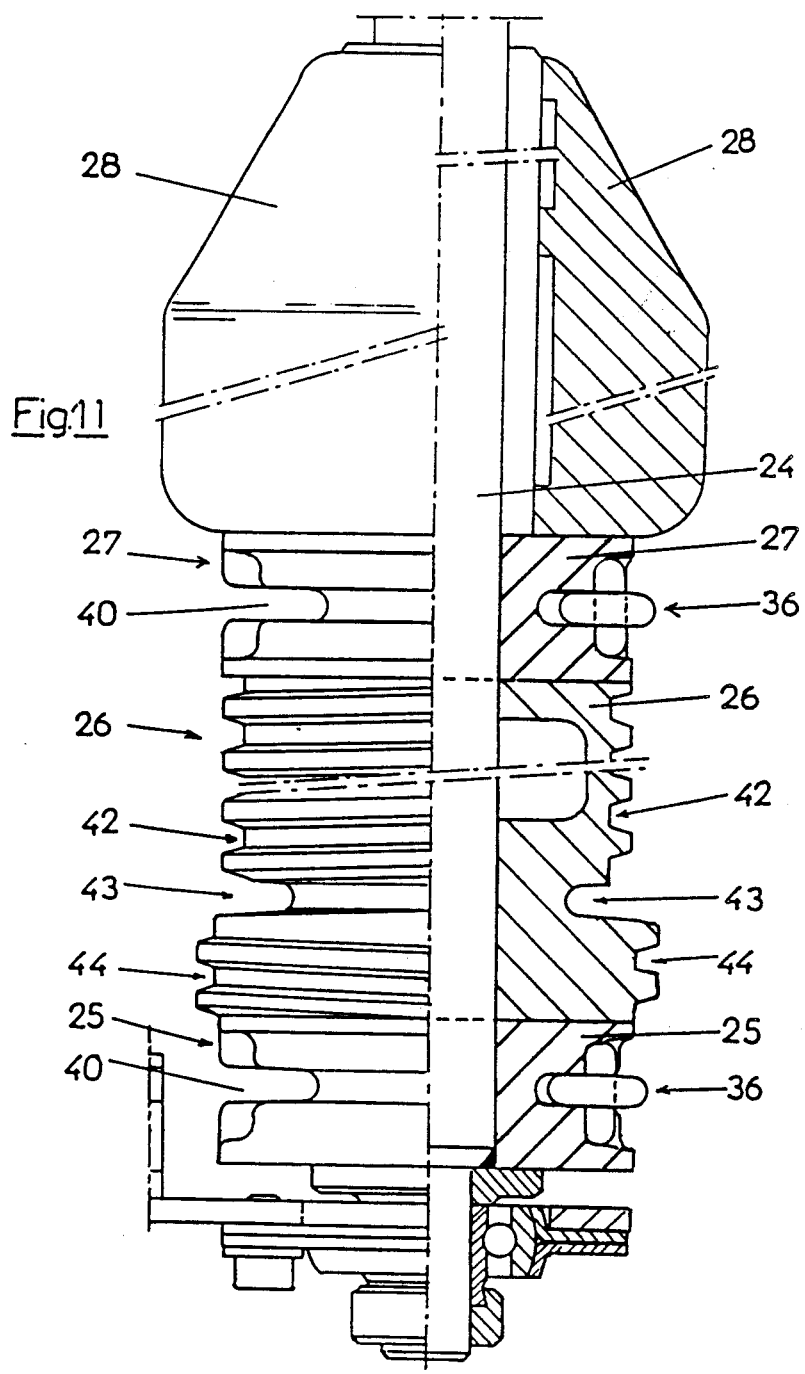
FIG. 11 is an elevational and axial half-sectional view showing, in particular, a guide cylinder provided on each lifting and guiding assembly of the illustrated machine.

As will be seen from FIG. 11 of the drawings, each guide cylinder 26 is formed with an external helical groove 42 which is open at its lower extent into a circular groove 43. Moreover, below each circular groove 43, the respective guide cylinder 26 is formed with a shallow helical groove 44 which spirals in a direction opposite to that of the groove 42. The function of the worms defined by the helical grooves 42 is to guide the lifting wires F raised by the rotary members 32 into the circular groove 43 of the respective worm. In addition, it is a function of the worms defined by the lower helical grooves 44 to return the lifting wires F to the circular groove 43 in the event that the wires escape therefrom.

Each upper vegetation channeling device 156 includes a deflector-type casing 45 (see FIG. 5). The inside wall of each casing 45 converges from front to back in the direction of the plane of symmetry of the plant training head. The deflector-type casings 45 are each rigidly joined to the respective casing 31 by a gusset plate 46.

The top edge of the inside walls of each casing 45 supports a guide track 47 (see FIG. 6) similar to guide track 41. A calibrated chain 48 similar to the chain 36 passes through each guide track 47 between the respective sprocket 27 and a driven recessed sprocket 49 positioned on the front end of the casing 45.

The driven recessed sprockets 37 and 49 are mounted in a known manner on movable supports to allow the tension of the chains 36 and 48 to be adjusted.

It will be understood that the lower continuous chain 36 has a dual role: to transmit drive to the axle of the rotary member 32, and to lift and convey raised vine shoots or branches of the plants to be trained.

Each upper chain 48 has a dual role: firstly to guide and convey raised vine shoots or branches, and secondly to move such shoots or branches away from the lugs 35 of the rotary member 32, to prevent overcrowding.

It is possible to replace the chains described above with other continuous flexible linkages or by other continuous hinged linkages such as belts, laterally bending roller chains, and the like.

As will be seen from FIG. 5, each protecting and conveying sleeve 28 is made from a semi-rigid material is formed with vertical and peripheral serrations 28a, 28b respectively. The diameter of each sleeve 28 is larger than the diameters of the transmission sprockets 25 and 27 and the guide cylinder 26.

The functions of each sleeve 28 are, on the one hand, to protect the various transmission and guiding members positioned below the sleeve from damage as they pass over stakes supporting the plants to be trained and, on the other hand, to hold the vine shoots in raised positions.

Figure 12:
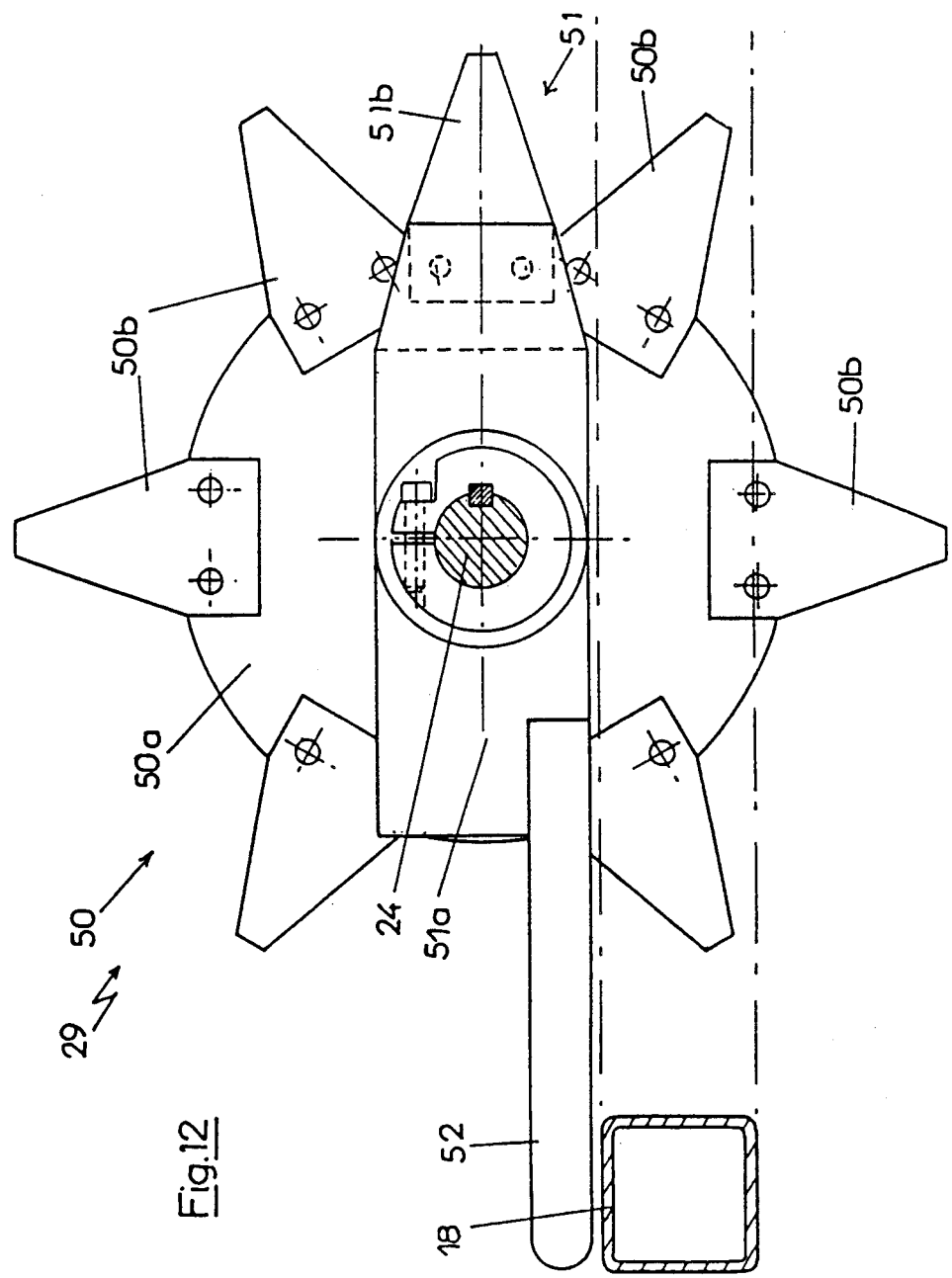
FIG. 12 is a plan view of a vegetation cutting and channeling assembly of the illustrated machine, the assembly being mounted on the upper part of a transmission shaft operable to drive each lifting and guiding assembly of the machine.

Each vegetation cutting and conveying assembly 29 (see FIG. 12) includes a rotary knife 50 secured by pins and wedges onto the shaft 24. The knife 50 includes a circular facing plate 50a which carries on its periphery replaceable and interchangeable radial cutting blades 50b. Positioned above the knife 50 is a counter-knife 51 comprising a blade holder 51a mounted, by means of a friction washer, onto the hub of the rotary knife 50. The counter-knife 51 includes replaceable and interchangeable counter-blade 51b.

To enable the counter-blade 51 to be locked in position, the blade holder 51a is rigidly connected to a radially directed lever 52, which, when the shaft 24 is set in rotation, abuts the adjacent vertical upright 18.

The blades 50b and 51b cut by a shearing action. They are equipped with known means to enable their respective heights to be adjusted along the shafts 24. The adjustment means may, for example, comprise screwdown clamps positioned above and below the hub of the blade and counter-blade assemblies. Furthermore, the cutting members are offset vertically so that they overlap in the vertical plane of symmetry P—P of the plant training head 151 (see FIG. 2).

The cutting and conveying assemblies 29 have a dual function: to convey lifted vine shoots or branches, and to prune those shoots or branches which are considered too long.

The rotary members 32, the vegetation channeling devices 155 and 156, the guide means 26, the sleeves 28 and the cutting members 29 make up the two assembles 153 for raising and guiding the lifting wires F and channeling the raised vegetation. These assemblies are disposed one on each side of the plane of symmetry of the plant training head 151 of the plant training machine M, and together define a feed opening whose width can be adjusted by means of the cylinders 20. The two assemblies are arranged so as to converge in the direction of the aforesaid plane of symmetry P—P whereby the branches and/or shoots of the plants to be trained and the respective lifting wires F are progressively gathered and drawn together thereby making it easier to throw a belt around the plants to facilitate the final operation of connecting together the neighbouring lifting wires F.

Figure 13:
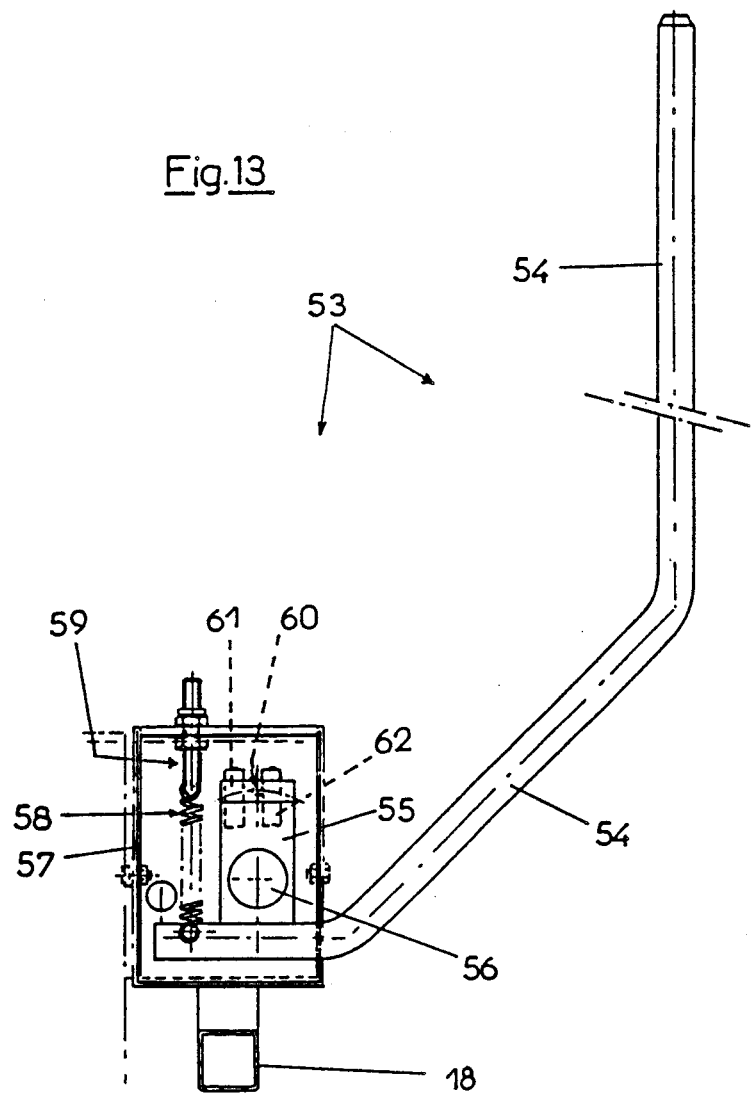
FIG. 13 is a plan view from above of a shoe for detecting and controlling centering of the plant training head of the machine.

On its lower portion, at least one of the lifting and guiding assemblies includes at least one device for automatically guiding and centering the plant training machine with respect to a row of vine or bush stocks. In the embodiment illustrated, only the outer lifting and guiding assembly remote from the tractor T is equipped with such a device. As will be seen from FIGS. 1, 2 and 13, the device comprises two detecting and guiding shoes 53,53 disposed one behind the other and mounted on the lower end of the outermost upright 18 of the chassis 15 of the plant training machine M proper. Each of these shoes has a feeler 54 comprising a double-elbow rod. Each feeler includes a mounting plate base 55 mounted for pivotable movement on a vertical axle 56 housed in a casing 57. Each feeler 54 is secured to one end of a return tension spring 58, the other end of which is connected to a fastening system 59 which enables the spring tension to be adjusted. At its free end, each mounting plate 55 includes a magnet 60. Below the magnet and in proximity to the ends of the path thereof, are disposed two proximity sensors 61, 62. These sensors may be magnetic sensors, for example, Hall effect sensors.

The sensors 61, 62 form part of an electrical control circuit of a solenoid valve which controls operation of the jack 9. The magnet-holder mounting plate 55 and its associated components 56–60 and the sensors 61, 62 are housed in the casing 57.

When the plant training machine M is in position, the feelers 54 are swivelled into positions intermediate their two extreme positions.

If the plant training machine is too close to the tractor T, because of their contact with the bases of the plants to be trained, the feelers 54 swivel until they reach one of their extreme positions; the magnet 60 is consequently moved into close proximity to one of the sensors 61, 62 and sends a signal to the solenoid valve to effect operation of the jack to recentre the plant training head 151.

If, on the other hand, the plant training machine moves away from the tractor T, the feelers 54 move out of contact with the base of the plants; consequently, they swivel until they reach their other extreme positions to cause the magnet 60 to move into proximity with the second sensor. A signal is then sent to the solenoid valve to effect operation of the jack to recentre the plant training head accordingly. This time, however, there is a positional correction only if the two feelers are in the above-mentioned position.

The jack 9 may be equipped with a device for allowing only limited adjustment of plant training machines with respect to the tractor to avoid impact therewith. This device may comprise a magnet recessed in the shank of the jack and a magnetic sensor fixedly mounted in proximity to said magnet, for example, in a support set around the shank.

It is possible to neutralize the automatic electronic guidance device in the event, for example, that there is a break between the plants of any given row.

The height of the shoes 53 above ground level can be adjusted by any known means.

Figure 14:
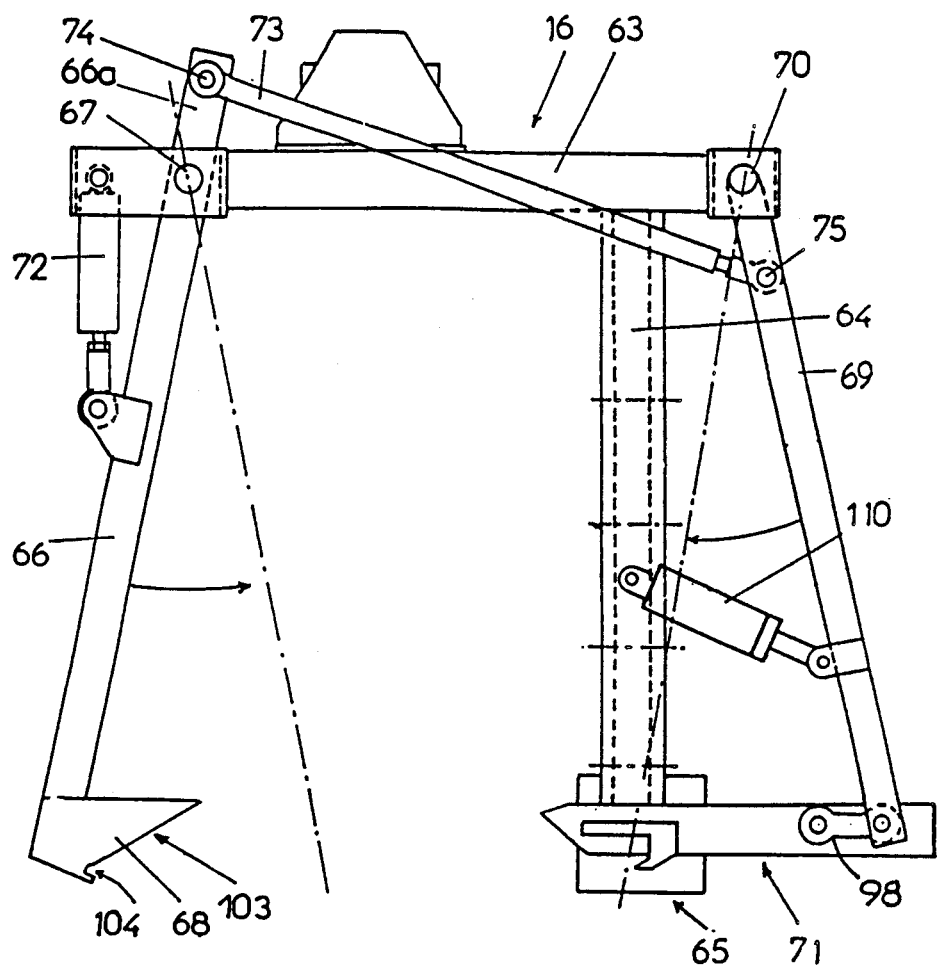
FIG. 14 is a schematic rear view of a clip attachment assembly of the machine.

As will be seen from FIG. 14, the auxiliary chassis 16 which carries the clip attachment assembly 4 includes a transverse beam 63. The following members are supported from the beam 63: (1) a vertical leg 64 which is secured at its upper end to the beam 63 at a position close to a first end of the beam and which carries on its lower end a static part of a clip attachment machine 65; (2) a first clip attachment assembly arm 66 mounted by means of a hinge pin 67 for pivotal movement in a transverse plane relative to the beam 63, the pin 67 being positioned close to the end of the beam 63 remote from the leg 64; and (3) a second clip attachment assembly arm 69 mounted by means of a hinge pin 70 for pivotal movement relative to the beam 63 in a transverse plane. The first arm 66 carries on its lower end a needle or holding prong 68 capable of drawing one raised lifting wire towards another such wire and of holding the raised wires during the clip attachment operation. The second arm 69 is positioned close to the vertical leg 64 and carries on its lower end a movable part or clip attachment jib 71 of the clip attachment machine 65.

Synchronized movement of the arms 66 and 69 in the aforesaid transverse plane perpendicular to the direction of travel of the machine, achieves the objective of drawing together or moving apart the holding prong 68 and the clip attachment jib 71. This synchronized movement is effected by the following: a jack 72 connected at one end through a hinge to the beam 63 and at its other end to a bracket which is secured to the arm 66 at position below the pin 67; and a link 73 connected by means of spherical joints (balls) 74, 75, at its first end to an upper end 66a of the first arm 66, and at its second end to a bracket which is secured to the second arm 69 at position below the pin 70.

Figure 15:
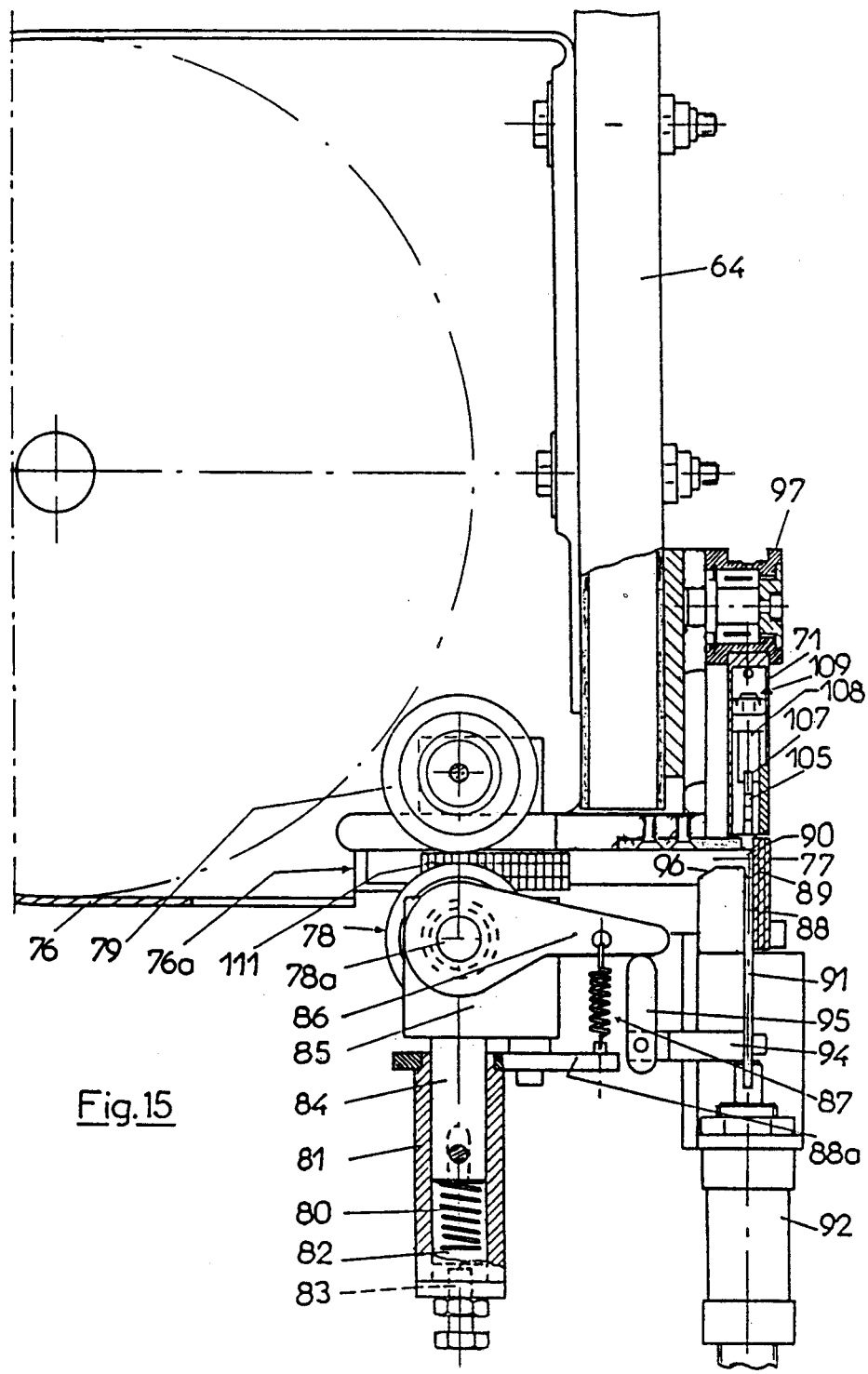
FIG. 15 is a side view partially in cross-section, of a clip attachment machine of the clip attachment assembly schematically illustrated in FIG. 14.

As will be seen from FIG. 15, a clip loading mechanism 158 of the clip attachment machine 65 comprises a casing 76 capable of receiving a supply of clips in the form of an elongate strip which can be reeled and accommodated in the form of a roll in the casing. The casing 76 is secured to the vertical leg 64, and an exit port 76a provided in the casing opens into a guide channel 77 provided by a frame 88 of the clip attachment machine 65.

The machine 65 includes a pair of capstans, comprising a lower driving wheel 78 and an upper support wheel 79, which are positioned at the entrance to the guide channel 77. Advantageously, the driving wheel 78 comprises a free wheel whose hub 78a is able to turn freely in one direction without causing the wheel to move, whereas rotation of the hub in the other direction causes corresponding rotation of the wheel 78.

The pressure of the driving wheel against the base of the strip of clips can be regulated by means of a device comprising, for example, a compression spring 80 set in a tubular guide 81 extending from the machine frame 88. The spring being positioned, at its opposite ends, against a circular stop 82 movable by an axial screw 83 which protrudes into the lower end of the guide 81, and against the lower free end of a column 84 mounted for sliding movement within the guide 81. The column 84 is rigidly attached to a bearing support 85 of the wheel 78.

The hub 78a of driving wheel 78 is secured to a pivotable lever 86 connected to one end of a tension spring 87. The spring 87 is connected at its other end to a fixed element 88a of the frame 88 of the clip attachment machine. The spring 87 ensures that the lever swivels in a direction corresponding to its active course.

The guide channel 77 opens into a holding chamber 89 provided inside the frame 88, the chamber 89 being configured and proportioned to receive a clip introduced by the loading mechanism described above. The chamber 89 has an upper opening 90 provided in frame 88 which allows a clip to be expelled upwardly. Beneath the chamber 89 is disposed a vertically movable pusher 91 operated by a small subjacent jack 92 fixedly mounted with respect to frame 88. The pusher 91 is slideably housed in a vertical channel. The vertical channel opens into the bottom of the holding chamber 89 and is partially defined by a fixed guide member 93 (see FIG. 16) connected to the frame 88. The pusher 91 is secured to a horizontal mounting plate 94 which supports a vertical, upwardly directed finger 95. The top end of finger 95 lies in contact with the bottom face of the lever 86 whereby upward movement of the finger 95 causes the lever 86 to swivel against the action of the spring 87. A top edge 96 of the guide channel 77 at its exit is defined by a sharp guillotine and operates to separate an individual clip from a strip when the pusher 91 is moved upwardly. The separated clip is expelled through the opening 90 from the channel 77.

The static portion of the clip attachment machine 65 further comprises two pairs of stepped rollers 97,97 which operate to guide the movable clip attachment jib 71. The rollers 97 are supported from the rear face of the fixed frame 88 of the clip attachment machine.

As will be seen from FIGS. 17 and 18, the jib 71 is fixed on the lower end of the second arm 69 (see also FIG. 14) by means of a twin ball-joint 98. The jib 71 has an elongate, rectilinear body, the free end of which comprises a needle having two inversely directed bevelled edges 99, 100. The free end of the jib is formed with a notch 101 which, in order not to hinder sliding movement of the jib between the rollers 97,97, is offset in a plate 102 mounted on the rear face of the jib body with a release mechanism to allow it to pass in front of the lowermost roller closest to the centre of the plant training machine.

The lower bevelled edge 99 of the jib needle has the dual function of facilitating penetration of the jib 71 into vegetation to be trained and of guiding one of the lifting wires F into the notch 101.

For the same purposes, the holding prong or needle 68 mounted on the lower end of arm 66 has a downwardly directed bevelled edge 103 which terminates in a notch 104 (see FIG. 14) provided in holding prong 68.

As will be seen from FIGS. 15, 16 and 19, near its free end, the jib 71 is provided with a downwardly opening compartment 105 capable of receiving a clip 111 in accordance with the invention; such a clip will be described in more detail below with reference to FIGS. 20 to 22. When the jib 71 is in its open or outwardly returned position, the compartment 105 is located exactly above the holding chamber 89 with which it communicates.

The opposite side walls of the compartment 105 are provided with a raised surface 106 to allow a clip inserted into said compartment to be located.

Figure 16:
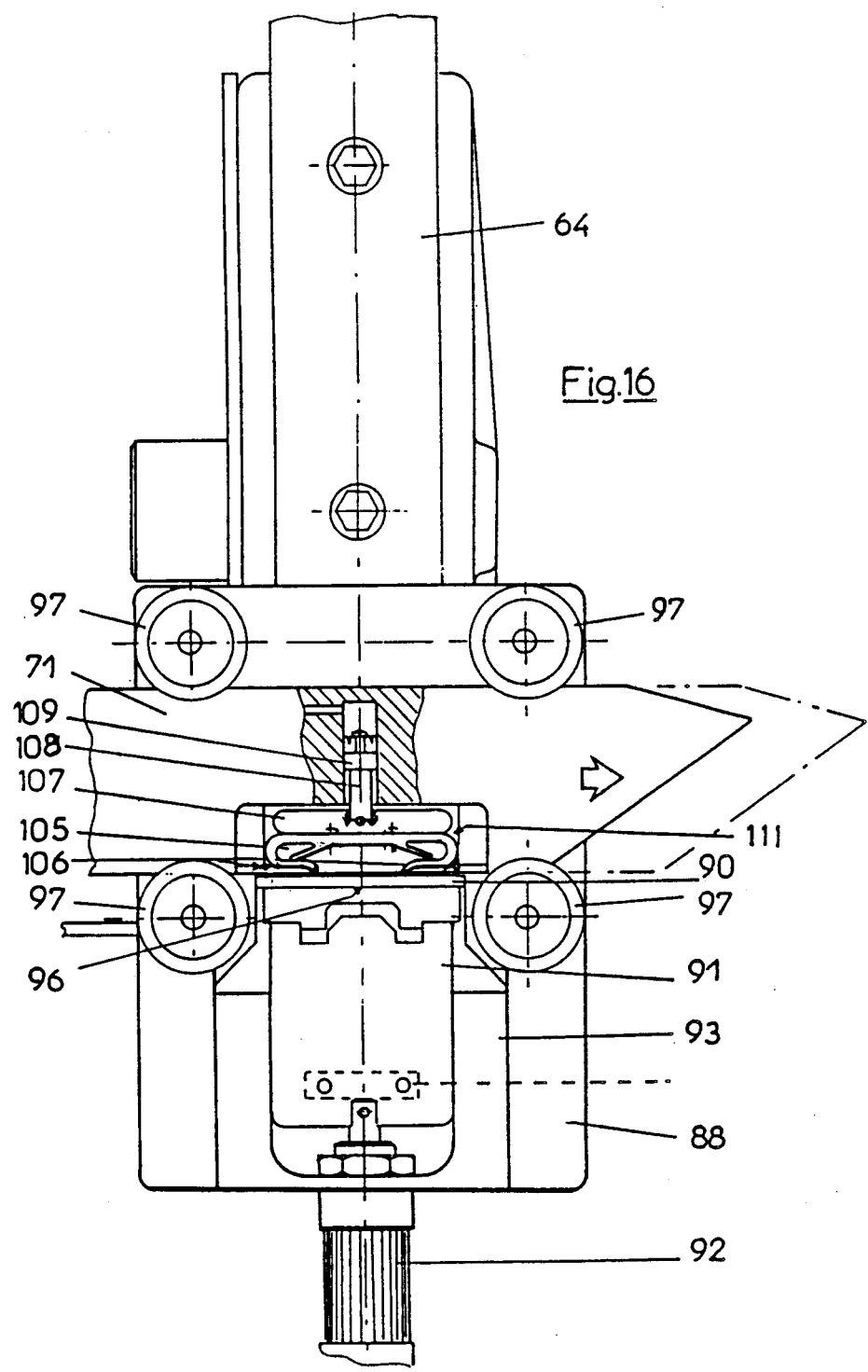
FIG. 16 is a front view, with partial cross-sections, of the clip attachment machine illustrated in FIG. 15.

In the upper part of the compartment 105 is provided an ejector comprising a push-type bar or butterfly 107, which is joined in its central portion to a rod 108 of a jack 109 (see FIG. 16). The length of the butterfly 107 substantially corresponds to that of the clips employed, and it may have in its lower part a central recess (not shown) delimiting two opposing baseplates. Thus, balanced pushing forces can be exerted on the back of a clip engaged in the compartment 105 when the clip is being expelled and applied to lifting wires F.

As will be seen from FIG. 14, a double-acting pneumatic jack 110 is connected, at its opposite ends through hinges to the fixed vertical leg 64 and the moving second clip attachment arm 69. The opposed pressure chambers of the jack 110 respectively communicate with the jack 92 and the jack 109; supply to the chambers is controlled by solenoid valves actuated by a system of proximity sensors, for example, magnetic sensors such as Hall effect sensors. The sensors are mounted on the static part of clip attachment machine 65 and are activated by a magnet carried by the jib 71.

Figure 24:
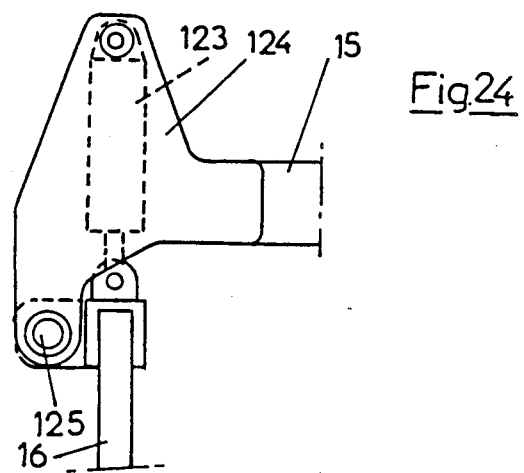
FIG. 24 is a side view illustrating a seesaw mounting of a chassis of the illustrated machine which carries the clip attachment assembly of the plant training machine.
Figure 23:
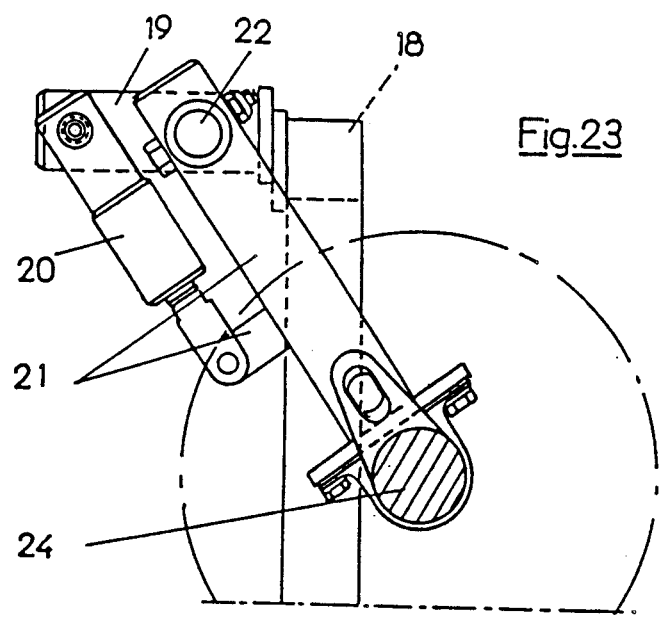
FIG. 23 is a plan view illustrating a means for adjusting the direction of wire raising and guiding means and the vegetation channeling means of the plant training machine.

As will be seen from FIGS. 1 and 24, a single acting hydraulic return jack 123 is connected at its opposite ends via hinges, to a frame 124 carried by the main chassis 15 and to the upper end of the auxiliary chassis 16. The auxiliary chassis 16 is suspended from the frame 124 by a hinge joint comprising a transverse axle 125. The auxiliary chassis 16 carrying the clip attachment means is thus suspended from main chassis 15 in a manner such that it is able to rock from front to back and vice versa, when viewed in the direction of travel of tractor T. The jack 123 is connected in parallel to the hydraulic jack 72.

In order not unnecessarily to complicate the description and drawings, the various hydraulic, electromechanical and electronic control devices for the various motors and actuators of the machine are not described here, such devices being known per se.

FIGS. 20 to 22 illustrate a clip fastener for use with the plant training machine described above and its manner of placement.

This clip or clip fastener 111 is made in one piece, for example, from any suitable plastics material, preferably biodegradable, having a degree of rigidity and an ability to be deformed elastically; suitable material include polyamide (e.g. "Nylon").

The clip has a rectilinear body 112, the ends of which are returned to form two opposing hooks 113,113, each defining with the body 112 one of two forwardly facing openings 114.

The body 112 is partially defined by two generally flat plane side surfaces, namely, an outer surface 115, and an inner surface 116, the inner and outer surfaces being plane and generally parallel to one another.

Each hook 113 has a limb 117 spaced from the body 112 and directed toward a centre or median transversal plane P'—P of the clip. The limbs 117 are spaced from and generally parallel to the body 112, each limb and body portion parallel to it defining a lifting wire acquisition space 120.

A free end 118 of each limb 117 is advantageously bent outwardly to form an angle of, for example, about 40 degrees with respect to the main portion of its limb.

The free ends 118 of the limbs 117 are spaced apart, this spacing defining an access opening 119 of the clip.

An obstacle which can be surmounted by elastic deformation of at least part of the clip is disposed at the entrance of said spaces 120 bordered by limbs 117 of hooks 113. The obstacle can form part of the body 112 or of the limb 117 of the respective hook. The obstacle is advantageously configured to be easily surmounted in the direction of penetration into the compartment 120 and to be impassable in the opposite direction.

In a preferred embodiment as shown, each obstacle comprises a catch 121 comprising a tongue capable of elastic deformation and connected by one of its ends to the body 112.

The tongues 121 extend from the body 112 until they touch, or almost touch, an inside surface 122 of the limbs 117 of the hooks 113.

More precisely, the tongues 121 are inclined at, say, an angle of around 20 degrees towards the interior of the hooks 113.

Thus, the tongues 121 define catches which are capable of bending only in the direction of the body 112 to allow lifting wires F to pass in a direction towards the bases of the hooks. The free ends of the tongues 121 abut the limbs 117 to prevent bending of the tongues in a sense to allow wires F present in the spaces 120 to escape therefrom.

In an unillustrated alternative embodiment, the flexible tongues 121 are attached to the inside surface 122 of the limbs 117 of the hooks 113 and extend into contact with, or almost into contact with, the inner surface 116 of the body 112. In this case the flexible tongues are likewise and advantageously inclined with respect to the rectilinear portion of the limbs 117 which lie parallel to the body 112, and extend in the direction of the bottom of the space 120 partially defined by each hook and the body.

FIGS. 21 and 22 show how a clip in accordance with the invention is placed in position on two wires F1 and F2 running side by side.

The wires F1 and F2 are drawn together by means of the holding prong 68 and the end of the jib 71, and the clip 111 is brought over the top of the wires with its opening 119 pointing downwardly (see FIG. 21). The clip is then placed in position by the jack 109 so that it straddles the two wires.

When the wires are released they will tend to pull apart so causing the flexible catches 121 to be lifted to trap the wires within the spaces 120 once the catches have returned to their initial positions (see FIG. 22).

Held in this way, the wires cannot accidentally escape from the clip.

It will be noted that it is a function of the inclined free ends 118 of the limbs 117 to ensure that the wires F1 and F2 are held in position as the wires are drawn apart, the sloping inner faces of the ends 118 defining ramps which guide the wires towards the interiors of the hooks 113.

Furthermore, the arrangement of the catches 121 has the advantage of limiting the extent of useful flexure of the catches and of helping to hold the wires F1, F2 in the hooks 113.

As mentioned previously, the clips 111 preferably take the form of strips comprising a plurality of individual clips initially interconnected along their outer plane flat side surfaces 115. Accordingly, such a strip of clips can be introduced in the form of a roll into the casing 76 of the clip loading mechanism of the clip attachment machine 65; each clip can readily be detached from the strip by the force exerted by the pusher 91 and will be introduced one at a time into the holding chamber 89 of the loading mechanism of the clip attachment machine.

The plant training machine M described above operates in the following manner.

The machine is firstly brought to one end of a row of vine stalks or other shrubs and the lifting and wire guide means 2 and 3 of the plant training head 151 are swivelled about vertical shafts 22 so as to enlarge the channeling opening of the plant training head 151. The movable parts 68, 71 of the clip attachment assembly 4 are spaced apart to straddle the end of the row.

The lifting and guide means 2 and 3 are set in rotation by motors 23. As the plant training machine M advances along the sides of the row, the relaxed lifting wires F which initially are in their lowered positions, are lifted by the rotary members 32 and automatically fed into the grooves 33 in the members 32; the wires are then guided by helical grooves 42 and 43 of the guide cylinders 26 into the circular positioning grooves 43. The lifting and guiding assemblies are then drawn together and the raised lifting wires are held in position by the positioning grooves.

As the machine moves forwardly, shoots or drooping branches of the bushes of the row are set upright as the lifting wires are raised, and the chains 36 and 48, the active strands of which circulate from front to back, exert a complementary lifting action on the vine shoots or branches righted by the lifting wires; the chains and their guide tracks 41, 47 also serve to channel or convey the raised shoots or branches towards the back of the plant training head 151. As indicated above, the protective and conveying sleeve 28 and the cutting and conveying assembly 29 also help to convey the raised shoots or branches.

The clip attachment system enables the clips 111 to be placed on the lifting wires F1, F2 as they are held a constant distance apart by the guide cylinders 26.

When the holding prongs 68 and the clip attachment jibs 71 of the clip attachment assembly 4 are spaced apart, the compartment 105 of the jib 71 is positioned to align with the position of the holding chamber 89 of the clip attachment machine 65.

A loading system 78-86-87 enables a clip 111 to be inserted into the holding chamber 89 of the static part of machine 65. The clip is transferred to the compartment 105 of the jib 71 by virtue of a lifting force applied by the pusher 91 as it is displaced by the jack 92, which itself is actuated by the jack 110. When the pusher 91 descends again, the spring 87 imparts a rotational movement to the free wheel 78 to ensure that the strip of clips is advanced in the guide channel 77 and a new clip is introduced into the holding chamber 89.

The movable parts 68, 71 of the clip attachment assembly 4 are then drawn together by the action of the jack 72. By the end of its travel, the lifting wires F F1 and F2 are held in the notches 101 and 104 of the prongs or needles of the movable parts and the compartment 105 containing the clip 111 is positioned above the wires. The clip is finally expelled from its compartment and fastened on the immobilized wires by the action of the ejector 107-108-109, the ejector being actuated by the jack 110.

The following will be observed: when it swivels inwardly, the arm first 69 compresses air present in one of the chambers of the jack 110 (the chamber connected to the jack 109); and when the jib 71 reaches the stop position, the magnet with which it is equipped activates one of the sensors provided on the static portion of the clip attachment machine. The sensor then sends a signal to the device to cause an electrical distributor to open and release the compressed air, actuating the piston of the clip ejecting jack 109; when the arms 66 and 69 are drawn together, the jack 123 causes the auxiliary chassis 16 to swing backwards so that the clip attachment machine remains static (while the tractor continues to advance) for the brief moment corresponding to the clip placement operation.

It is also a function of the jack 123 to provide a safety mechanism in the event that an obstacle is encountered (i.e. a stake).

After the clip 111 has been ejected and fastened on the lifting wires F1 and F2, the action of the jack 72 returns the movable parts 68, 71 of the clip attachment assembly 4 to their initial spaced position. As indicated above, when the wires are released again they automatically engage in the spaces 120 of the clip 111, where they are then trapped.

When the arms 66 and 69 move apart, they produce compression of air in the second chamber of the jack 110 (the chamber connected to jack 92). When the second sensor is activated by the passage of the magnet carried by the jib 71, it controls a second electrical distributor to release the compressed air, actuating the jack 92 to introduce a new clip into the compartment 105 of the movable jib 71.

The clip attachment operation may be controlled by the operator from the driver's seat, or else automatically, using a known timing device which controls clip placement at regular intervals.

I claim:

1. A machine for training plants to be supported between two lifting wires positioned one to each side of a row of such plants by repositioning the lifting wires from a relaxed position at or near the ground one on each side of the row to a level position generally parallel to the ground at a predetermined height above the ground thus to raise and support the plant vegetation between the lifting wires at the predetermined height and by connecting the raised lifting wires together at selected intervals to support the plant vegetation between the wires and to tend to support the lifting wires on the trained plants; the plant training machine being mounted on a prime mover for movement along a row in an intended direction and including
   (a) a plant training head comprising:
      (1) first and second lifting means for raising from relaxed position the aforesaid lifting wires and the plant vegetation to be supported therebetween, and
      (2) first and second guide means positioned behind the lifting means in the intended direction of travel of the machine for guiding and drawing together the raised lifting wires; and
   (b) connection means positioned behind the guide means in the intended direction of travel of the machine for interconnecting the raised lifting wires;
   (c) the arrangement being such that, in operation of the plant training machine said first lifting means and said first guide means are positioned on one side of said row of plants and said second lifting means and said second guide means are positioned on the other side of said row of plants.

2. The plant training machine as claimed in claim 1, wherein:
   (d) each lifting means comprises a rotary member having about its periphery a groove which, in use of said machine, receives and guides one of the two lifting wires.

3. The plant training machine as claimed in claim 2, wherein:
   (e) each rotary member is of generally truncated shape, the peripheral edge of largest diameter being provided with outstanding radial lugs.

4. The plant training machine as claimed in claim 2 further comprising:
   (e) means operable to adjust the direction of travel of the rotary members.

5. The plant training machine as claimed in claim 1 further comprising:
   (d) vegetation guide means for branches and shoots of vegetation raised by the lifting means, said guide means being positioned at least partially behind the lifting means in the intended direction of travel of the machine.

6. The plant training machine as claimed in claim 5 wherein:
   (e) the vegetation guide means includes at least one continuous flexible linkage supported between driving wheels and driven wheels.

7. The plant training machine as claimed in claim 6, wherein:
   (f) flexible linkage comprises a calibrated chain including a plurality of perpendicular links.

8. The plant training machine as claimed in claim 6, wherein:
   (f) each vegetation guiding means includes two continuous flexible linkages disposed one above the other.

9. The plant training machine as claimed in claim 1, wherein:
   (d) the guide means includes a rotary cylinder having a circular groove and a first external helical groove which terminates at its lowermost extent in said circular groove.

10. The plant training machine as claimed in claim 9, wherein:
    (e) the rotary cylinder is formed with a shallow second helical groove spiraling in a direction opposite the spiral of the first groove, the second groove being positioned below the said circular groove.

11. The plant training machine as claimed in claim 6, wherein:
 (f) each guide means includes a serrated sleeve positioned above the rotary guide cylinder, the diameter of the sleeve being greater than that of the cylinder.

12. The plant training machine as claimed in claim 1, wherein:
 (d) each guide means includes a height-adjustable cutting member.

13. The plant training machine as claimed in claim 1, wherein:
 (d) said first lifting means and guide means are pivotably mounted on a vertical shaft, and said second lifting means and guide means are pivotally mounted on a parallel vertical shaft such that the area of the feed opening defined between such means can be adjusted.

14. The plant training machine as claimed in claim 1, wherein:
 (d) the connection means comprises:
  (1) a static member comprising a loader for a plurality of connecting clips, a holding chamber formed with an upper expulsion opening for receiving one such clip, a means for introducing the clips individually into said holding chamber, a pusher member positioned below said holding chamber for expelling a clip housed therein,
  (2) a movable jib member guided by said static member and including a downwardly opening compartment configured to receive a clip and an ejector positioned within the upper portion of said compartment, and
  (3) means for displacing the movable jib member toe bring it either into a position whereby its compartment is located above the holding chamber or into a position in which the compartment is located above the lifting wires when they have been raised and drawn together by the lifting and guide means.

15. The plant training machine as claimed in claim 14, wherein:
 (e) means is provided to move the clips through the loader, the movement means comprising a free wheel whose hub is secured to a pivotable lever connected to one end of a tension spring, the lever being pivotable against the bias imposed by the spring by a member the upper end of which is positioned beneath said lever.

16. The plant training machine as claimed in claim 14, wherein:
 (e) the connection means comprises a clip attachment means which includes two needle members which can be moved in a sense to draw together and retain the plant support wires while the wires are being interconnected by means of the clips, one of said needle members comprising the front end of the said movable jib member; each needle having an upper limb provided with a sloping edge.

17. The plant training machine as claimed in claim 1, further comprising:
 (d) means for automatically guiding and centering the head with respect to a row of vine stalks or line of bushes to be trained.

18. The plant training machine as claimed in claim 17, wherein:
 (e) the automatic guiding and centering means includes at least one pivotable feeler mounted on the lower portion of an upright forming part of a chassis which supports the said lifting and guide means, said at least one feeler being such that, in use, it is moved into contact with the lower portions of the vine stalks or other bushes to be trained.

19. The plant training machine of claim 1, wherein:
 (d) the connecting means, the lifting means and the guide means are supported from a common support chassis, said support chassis being capable of being pivoted rearwardly.

20. The plant training machine as claimed in claim 6 wherein:
 (f) a prime mover mounted chassis supports the plant training machine with respect to the prime mover;
 (h) a main chassis supported by the prime mover chassis supports the plant training head;
 (i) a flexible linkage casing is fixedly supported with respect to the main chassis and supports the rotary members and the driving and driven wheels carrying the flexible linkage, the chasing being provided along its interior upper edge with a rigid guide track;
 (j) the continuous flexible linkage circulates in said guide track; and
 (k) the interior face of the casing provided with the guide track converges from front to back toward a plane of symmetry of the plant training head.

* * * * *